United States Patent
Kime et al.

(10) Patent No.: US 6,938,711 B2
(45) Date of Patent: Sep. 6, 2005

(54) FREESTANDING SELF-PROPELLED DEVICE FOR MOVING OBJECTS

(76) Inventors: Mark Chandler Kime, 1500 Wood St., Valparaiso, IN (US) 46383; Richard Hartley Johnston, 11152 West St., RD 2, Westville, IN (US) 46391

( * ) Notice: Subject to any disclaimer, the term of this patent is extended or adjusted under 35 U.S.C. 154(b) by 43 days.

(21) Appl. No.: 10/703,056

(22) Filed: Nov. 6, 2003

(65) Prior Publication Data

US 2004/0134692 A1 Jul. 15, 2004

Related U.S. Application Data

(60) Provisional application No. 60/423,749, filed on Nov. 6, 2002.

(51) Int. Cl.$^7$ .............................................. B62D 51/04
(52) U.S. Cl. ........................ 180/11; 180/19.2; 180/23; 280/767
(58) Field of Search ................................ 180/19.1, 19.2, 180/19.3, 11–13, 15, 16, 24.02, 23, 65.1, 904; 280/755, 767, 33.992, DIG. 5, DIG. 6

(56) References Cited

U.S. PATENT DOCUMENTS

| | | | | |
|---|---|---|---|---|
| 3,023,825 A | * | 3/1962 | Rodney ........................ 180/15 |
| 4,053,025 A | * | 10/1977 | Slusarenko .................. 180/2.1 |
| 5,439,069 A | * | 8/1995 | Beeler .......................... 180/11 |
| 5,573,078 A | * | 11/1996 | Stringer et al. ............. 180/19.2 |
| 5,580,207 A | * | 12/1996 | Kiebooms et al. .......... 414/495 |
| 5,937,959 A | * | 8/1999 | Fujii et al. ..................... 180/12 |
| 6,098,732 A | * | 8/2000 | Romick et al. ............... 180/23 |
| 6,179,076 B1 | * | 1/2001 | Fernie et al. .............. 180/65.1 |
| 6,564,890 B2 | * | 5/2003 | Coveyou .................. 180/24.02 |
| 6,729,421 B1 | * | 5/2004 | Gluck et al. .................. 180/11 |
| 6,871,714 B2 | * | 3/2005 | Johnson ..................... 180/19.2 |
| 2002/0084116 A1 | * | 7/2002 | Ruschke et al. .............. 180/11 |

FOREIGN PATENT DOCUMENTS

FR         2595650      *  9/1987

* cited by examiner

Primary Examiner—Anne Marie Boehler
(74) Attorney, Agent, or Firm—Gary M. Hartman; Domenica N. S. Hartman; Hartman & Hartman

(57) ABSTRACT

A freestanding self-propelled device for moving objects. The device includes a chassis having lower frame portions and upright frame portions. A single motor-driven drive wheel is centrally located between the lateral ends of the chassis and coupled to the chassis so as to be pivotable about a substantially vertical axis. The drive wheel is located between sets of support wheels coupled to the lower frame portion of the chassis. In combination, the drive wheel and the support wheels result in the device being freestanding. The drive wheel projects below the sets of support wheels so that the device is supported by the drive wheel and by only one of each set of support wheels at any given time, thereby establishing a three-point contact with the surface supporting the device. A tiller equipped with controls is pivotably coupled to the drive wheel for pivoting the drive wheel about its vertical axis.

18 Claims, 2 Drawing Sheets

FREESTANDING SELF-PROPELLED DEVICE FOR MOVING OBJECTS

CROSS REFERENCE TO RELATED APPLICATIONS

This application claims the benefit of U.S. Provisional Application No. 60/423,749, filed Nov. 6, 2002.

BACKGROUND OF THE INVENTION

1. Field of the Invention

The present invention generally relates to devices for moving objects, such as wheeled carts, beds, equipment, etc., including those used in medical, food service and industrial facilities. More particularly, this invention relates to a freestanding device that uses a single battery-powered drive wheel and can be attached to and used to move an object without significant physical effort by the operator.

2. Description of the Related Art

Movement of carts, beds and miscellaneous other equipment in medical, food service, and industrial facilities is typically done by hand. For this reason, such objects are often equipped with caster wheels that permit their relocation by pushing and pulling. However, movement in this manner can lead to physical injury to the mover, particularly in the case of large equipment. Motorized devices are desired that enable such objects to be moved safely through hallways and doors, while also being able to maneuver these objects within confined areas such as elevators.

BRIEF SUMMARY OF THE INVENTION

The present invention provides a freestanding self-propelled device for moving objects, such as wheeled objects. The self-propelled device has a single drive wheel and can be attached to and used to move carts, beds or most any other equipment currently pushed or pulled by human operators. The device can be operated without significant physical effort by the operator, thereby eliminating back, shoulder and wrist strain when attempting to move large objects.

The self-propelled device includes a chassis having lower frame portions and upright frame portions that extend upward from the lower frame portions. An apparatus is coupled to the upright frame portions for gripping a wheeled object. A single drive wheel is centrally located between the lateral ends of the chassis and coupled to the chassis so as to be rotatable about a horizontal axis and pivotable about a substantially vertical axis. An electrical motor is coupled to the drive wheel to cause rotation of the drive wheel, and at least one battery is coupled to the motor for delivering electrical power to the motor. A tiller is pivotably coupled to the drive wheel to enable pivoting of the drive wheel about its vertical axis. The tiller comprises controls for operating the motor and the drive wheel.

For stability and maneuverability of the device, the drive wheel is centrally located between first and second sets of support wheels coupled to the lower frame portion of the chassis. In combination, the drive wheel and the support wheels result in the self-propelled device being freestanding. However, the drive wheel projects below the first and second sets of support wheels so that the self-propelled device is supported by the drive wheel and by only one of the sets of support wheels at any given time, thereby establishing a three-point contact with the surface supporting the self-propelled device. The device is further equipped with a third set of support wheels mounted to the chassis and extending aft from the aft end of the chassis, so as to inhibit tipping of the self-propelled device in an aft direction thereof.

In view of the above, it can be seen that a significant advantage of this invention is that it can be attached to an object to be moved, such as a cart, bed, wheelchair, machine, or other equipment that may be equipped with wheels, and thereafter an operator can walk behind the device while operating the device through the controls on the tiller to move and maneuver the object. The device is both stable and highly maneuverable as a result of the arrangement of wheels supporting the chassis. As such, the self-propelled device of this invention is capable of moving large objects while significantly reducing the risk of stress to backs, shoulders, or wrists of workers who would otherwise be required to manually move such objects.

Other objects and advantages of this invention will be better appreciated from the following detailed description.

DETAILED DESCRIPTION OF THE INVENTION

Figure 1:
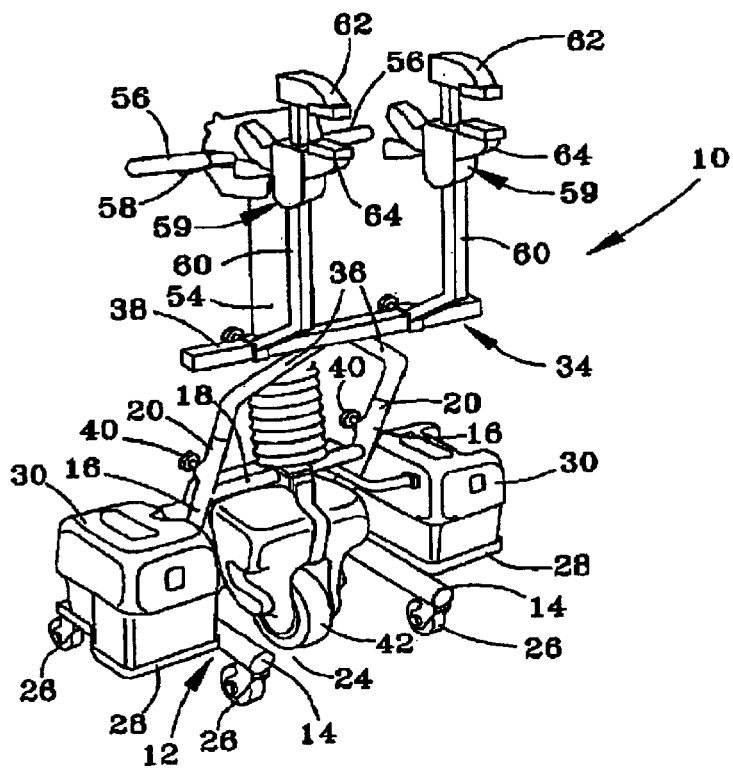
FIGS. 1 and 2 are front and rear perspective views of a self-propelled device in accordance with a preferred embodiment of this invention.
Figure 2:
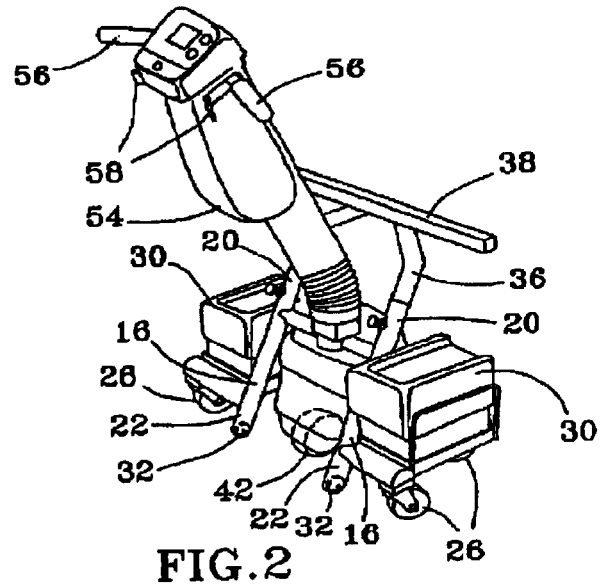

FIGS. 1 and 2 show a freestanding self-propelled moving device 10 in accordance with a preferred embodiment of this invention. As shown in the Figures, the device 10 comprises a chassis 12 that has a pair of lower frame members 14 that extend in the fore and aft directions of the device 10. A pair of hollow (e.g., tubular) upright frame members 16 are individually attached to the lower frame members 14, and a laterally-extending cross bar 18 interconnects midportions of the upright frame members 16. Each upright frame member 16 has an upper extremity 20 that projects above its corresponding lower frame member 14, and a lower extremity 22 that projects below its lower frame member 14. The upright frame members 16 are attached near their lower extremities 22 to their respective lower frame members 14 toward the aft end of the device 10. Furthermore, each upright frame member 16 is inclined in the fore direction of the device 10, preferably at an angle of about 64 degrees from horizontal, so that the lower extremity 22 of each upright frame member 16 projects in the aft direction of the device 10. The lower frame members 14 are spaced apart toward the lateral extremities of the chassis 12 so as to define a space 24 therebetween.

When viewed from above, the lower frame members 14 have an L-shape, with a first leg of the L oriented laterally at the aft end of the device 10. The second leg of the L is oriented fore and aft, with the aft end of the second leg attached to the first leg. A pivoting caster wheel 26 is mounted to the laterally outward end of each first leg of the lower frame members 14, while another pivoting caster wheel 26 is mounted to the fore end of each second leg of the lower frame members 14. As such, the chassis 12 is configured to have a quadrangle of four points of support defined by the wheels 26, with the wheels 26 at the fore ends of the lower frame members being closer together than the wheels 26 at the laterally outward ends of the lower frame members 14.

A tray 28 is mounted to each lower frame member 14 for supporting a battery housing 30 (and a battery therein) at each of the lateral ends of the chassis 12. Finally, a drag wheel 32 is shown mounted to each lower extremity 22 of the upright frame members 16 of the chassis 12. Because the upright frame members 16 are inclined relative to the lower frame members 14, the drag wheels 32 extend in the aft direction from the aft end of the chassis 12 and at an angle (e.g., about 64 degrees) from horizontal. As will be discussed further, the drag wheels 32 do not normally contact the surface on which the device 10 is supported, but come into contact with the surface if the device 10 is tipped in the aft direction, thereby inhibiting tipping of the device 10.

A T-bar 34 is shown coupled to the upright frame members 16 of the chassis 12. The T-bar 34 comprises a pair of legs 36 slidably received within the upright frame members 16, and a laterally-extending beam 38 between and interconnecting the legs 36. A knob 40 is threaded into each upright frame member 16 for engagement with the legs 36 to selectively permit or prevent movement of the legs 36 within the upright frame members 16. Because of the telescoping connection between the upright frame members 16 and the T-bar 34, the beam 38 of the T-bar 34 can be adjusted to various heights corresponding to, for example, a patient cart, bed, ultrasound machine, etc., which can be attached to the beam 38 as discussed below. In addition to the T-bar 34, various other structures could be mounted to the device 10 with the telescoping connections provided by the upright frame members 16. For example, a fork lift equipped with a suitable lifting mechanism could be constructed with legs sized to telescope within the upright frame members 16.

Figure 3:
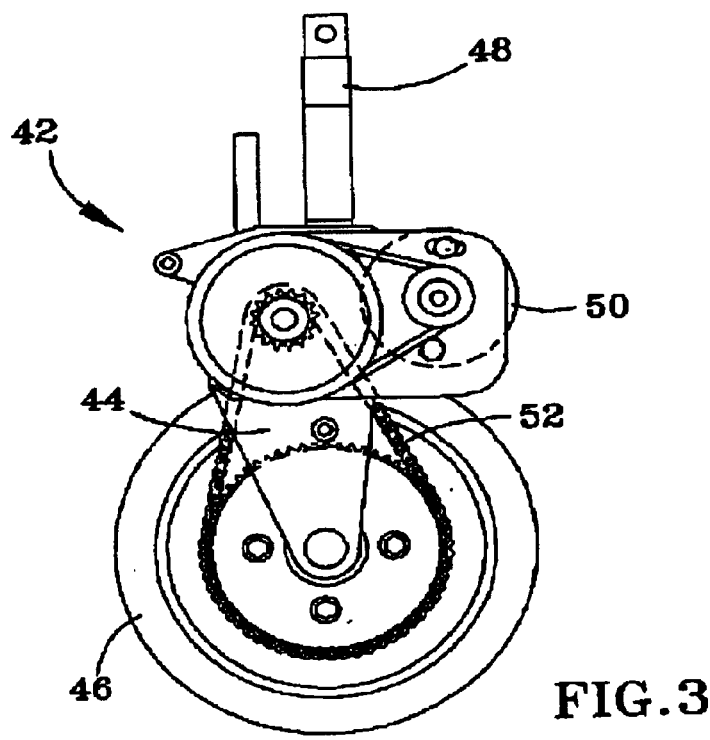
FIG. 3 is a side view of a drive wheel carriage of the device of FIGS. 1 and 2.

Located within the space 24 between the lower frame members 14 of the chassis 12 is a drive wheel carriage 42. FIG. 3 is an isolated side view of the drive wheel carriage 42, and shows the carriage 42 as comprising a fork 44 and a drive wheel 46 rotatably mounted to the fork 44. The fork 44 is equipped with a post 48 for pivotably mounting the wheel carriage 42 to the cross bar 18 of the chassis 12. The post 48 is preferably oriented so that the wheel carriage 42, including the fork 44 and wheel 46, has a substantially vertical axis about which the wheel 46 is able to pivot. The wheel 46 is preferably able to pivot a full 180 degrees, with both pivot limits preferably coinciding with the horizontal axis of rotation of the wheel 46 being oriented in the fore-aft direction. For storage, the carriage 42 is preferably equipped with a suitable locking feature (not shown) that prevents the wheel 46 from pivoting about its vertical axis. FIG. 3 also shows an electrical motor 50 mounted to the fork 44 and coupled to the drive wheel through a chain 52. Power for the motor 50 is provided by the batteries 30 supported on the lower frame members 14 of the chassis 12. The motor 50 is preferably a 24-volt, reversible direct current electric motor. While the motor 50 is shown as coupled to the drive wheel 46 with a chain 52, a drive belt or other suitable means could be used.

As evident from FIGS. 1 and 2, the drive wheel 46 is much larger than the caster wheels 26. Furthermore, the drive wheel 46 is centrally located between lateral pairs of the caster wheels 26, and projects below the caster wheels 26 so that at any given time the self-propelled device 10 is supported by the drive wheel 46 and by only one of each pair of castor wheels 26 (i.e., the fore pair of wheels 26 located at the fore end of the device 10, or the aft pair of wheels 26 located at the aft end of the device 10). As such, together the wheels 26 and 46 provide the device 10 with a three-point contact with the surface supporting the device 10. Because the drive wheel 46 is placed centrally amid the four points of support defined by the caster wheels 26, the device 10 is able to stand unattended when it is not connected to a cart, bed or other object. Because the caster wheels 26 are positioned and arranged so that only two (either the fore or aft pair) are engaged at any one time, maximum downward pressure is exerted on the drive wheel 46 for traction. Furthermore, forward thrust is brought to bear on the drive wheel 46 and the aft caster wheels 26, while reverse thrust is brought to bear on the drive wheel 46 and the two fore caster wheels 26. Stability and safety are enhanced by the presence of the drag wheels 32 at the lower extremities 22 of the upright frame members 16, particularly during forward operation when high loads and/or certain maneuvers can cause the device 10 to tilt backwards, thereby bringing the drag wheels 32 into contact with the surface on which the device 10 is supported.

Operation and maneuvering of the self-propelled device 10 are through a tiller 54 that is pivotably coupled to the fork 44. With the tiller 54, the device 10 can be steered by causing the drive wheel 46 to pivot about its vertical axis. The tiller 54 is preferably capable of being pivoted about 110 degrees relative to the fork 44, thereby adapting to the height of the operator. The tiller 54 is equipped at its upper end with a handlebar 56, on or near which controls are mounted for controlling the operation of the device 10, including its drive wheel 46 and motor 50. For example, current to the motor 50 is preferably controlled by a potentiometer activated by thumb switches 58 (one of which is visible in FIGS. 1 and 2) located adjacent the handlebar 56. A computer (not shown) can be housed within one of the covers housing the batteries 30 or within the tiller 54, through which the input from the switches 58 can be used to control the motor 50. In a preferred embodiment, the computer provides electronic braking and fully adjustable ramp of speed and power curves in both forward and reverse directions.

Figure 4:
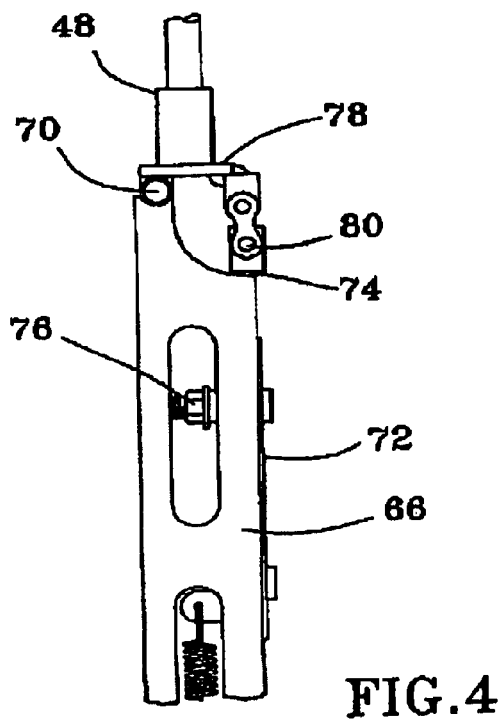
FIGS. 4 and 5 are side views showing articulation of a tiller-drive fork assembly of the device of FIGS. 1 and 2.
Figure 5:
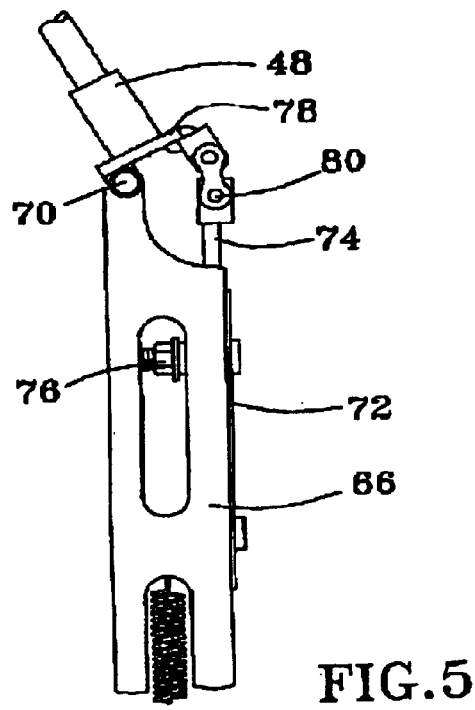

FIGS. 4 and 5 show the manner in which the tiller 54 is preferably connected to the fork 44 of the wheel carriage 42. The interior of the tiller 54 is shown in FIGS. 4 and 5 as comprising a frame 66 that is pivotably attached with a hinge 70 to a flange 78 on the fork 44. A pair of friction plates 72 and 74 are mounted to the frame 66. A first plate 72 is secured to the frame 66, while the second plate 74 is coupled to the first plate 72 under a compression load induced by a fastener 76. The compression load permits smooth movement of the second plate 74 relative to the first plate 72. One end of the second plate 74 is coupled with a second hinge 80 to the flange 78 of the post 48. As evident from comparing FIGS. 4 and 5, pivoting of the post 48 relative to the frame 66 of the tiller 54 (and therefore pivoting of the tiller 54 relative to the post 48) must overcome the frictional resistance of the plates 72 and 74.

As seen in FIG. 1, a gripping tool 59 is attached to the horizontal beam 38 of the T-bar 34. The gripping tool 59 is shown comprising a set of upper and lower jaws 62 and 64 mounted to an arm 60 adjustably mounted to the beam 38. According to a preferred aspect of the invention, the upper jaw 62 is immovably mounted to the arm 60 while the lower jaw 64 is movably mounted to the arm 60 for movement relative to the upper jaw 62. In this manner, engagement of an object with the tool 59 by upward movement of the lower jaw 64 results in a portion of the object's weight being transferred to the drive wheel 46, thereby improving traction of the drive wheel 46 and stability of the device 10.

Various other types of fastening and gripping attachments can be connected to the T-bar 34 to bind the device 10 to an object intended to be moved. For example, attachment to wheelchairs can be achieved by a handlebar side clamp or draw hasp attached to the beam 38 of the T-bar 34. The device 10 can also be attached to equipment such as an ultrasound machine with quick release clamps, again attached to the beam 38 of the T-bar 34.

In use, the operator activates the self-propelled device 10 to move forward or reverse by depressing the appropriate thumb switch 58 on the handlebar 56 of the tiller 54, and steers the direction of the device 10 by rotating the tiller 54 with the handlebar 56. The device 10 is both stable and highly maneuverable under significant loads as a result of the arrangement of the drive wheel 46, caster wheels 26, and drag wheel 32 supporting the chassis 12.

While the invention has been described in terms of a preferred embodiment, it is apparent that other forms could be adopted by one skilled in the art. For example, For example, the device could differ in appearance and construction from the embodiment shown in the Figures, and various materials could be used in its construction. Therefore, the scope of the invention is to be limited only by the following claims.

What is claimed is:

1. A freestanding self-propelled device for moving wheeled objects, the self-propelled device comprising:
   a chassis having oppositely-disposed fore and aft ends and oppositely-disposed lateral ends, the chassis comprising lower frame portions and upright frame portions extending upward from the lower frame portions;
   means coupled to the upright frame portions for gripping a wheeled object;
   a single drive wheel coupled to the chassis and centrally located between the lateral ends of the chassis, the drive wheel being rotatable about a horizontal axis and pivotable about a substantially vertical axis;
   means for causing rotation of the drive wheel;
   first and second sets of support wheels coupled to the lower frame portion of the chassis, the drive wheel being centrally located between the first set and the second set of support wheels and projecting below the first and second sets of support wheels so that the self-propelled device is supported by the drive wheel and by only one of each of the first and second sets of support wheels at any given time to establish a three-point contact with a surface supporting the self-propelled device;
   a third set of support wheels mounted to the chassis and extending aft from the aft end of the chassis so as to inhibit tipping of the self-propelled device in an aft direction of the self-propelled device; and
   a tiller coupled to the drive wheel to enable pivoting of the drive wheel about the vertical axis thereof, the tiller comprising means for controlling operation of the drive wheel.

2. The freestanding self-propelled device according to claim 1, wherein the lower frame portions are located at the lateral ends of the chassis.

3. The freestanding self-propelled device according to claim 2, wherein the rotation causing means comprises first and second batteries, the first battery being supported on a first of the lower frame portions located at a first of the lateral ends of the chassis, and the second battery being supported on a second of the lower frame portions located at a second of the lateral ends of the chassis.

4. The freestanding self-propelled device according to claim 1, wherein the gripping means comprises a laterally-extending beam and a pair of legs attached to and extending downward from the beam.

5. The freestanding self-propelled device according to claim 4, wherein the beam has a rectangular cross-section.

6. The freestanding self-propelled device according to claim 4, wherein the legs are slidably coupled to the upright frame portions of the chassis.

7. The freestanding self-propelled device according to claim 4, wherein the gripping means further comprises an arm adjustably attached to the beam and a set of upper and lower jaws mounted to the arm, the upper jaw being immovably mounted to the arm and the lower jaw being movably mounted to the arm for movement relative to the upper jaw.

8. The freestanding self-propelled device according to claim 1, wherein the drive wheel is pivotable approximately 180 degrees about the vertical axis thereof.

9. The freestanding self-propelled device according to claim 1, further comprising a fork to which the drive wheel is rotatably mounted, and means for pivotably connecting the fork to the tiller.

10. The freestanding self-propelled device according to claim 9, wherein the connecting means comprises friction members contacting each other and that move relative to each other when the tiller is pivoted relative to the fork.

11. The freestanding self-propelled device according to claim 1, wherein the first and second sets of support wheels are caster wheels.

12. The freestanding self-propelled device according to claim 1, wherein the third set of support wheels are mounted at lower extremities of the upright frame portions of the chassis.

13. The freestanding self-propelled device according to claim 1, wherein the third set of support wheels do not contact a surface supporting the self-propelled device unless the self-propelled device tips in the aft direction.

14. A freestanding self-propelled device for moving wheeled objects, the self-propelled device comprising:
   a chassis having oppositely-disposed fore and aft ends and oppositely-disposed lateral ends, the chassis comprising lower frame portions, upright frame portions attached to the lower frame portions, and a laterally-extending cross-member interconnecting the upright frame portions, the upright frame portions having upper extremities above the lower frame portions and lower extremities below the lower frame portions, the lower frame portions being located at the lateral ends of the chassis so as to define a space therebetween;
   means coupled to the upright frame portions for gripping a wheeled object, the gripping means comprising a pair of legs slidably received within the upright frame portions of the chassis, a laterally-extending beam between and interconnecting the pair of legs, and means for preventing sliding of the pair of legs within the upright frame portions;
   a fork pivotably mounted to the cross-member of the chassis, the fork having a substantially vertical axis about which the fork pivots;
   a single drive wheel rotatably mounted to the fork and located within the space between the lower frame portions of the chassis, the drive wheel having a substantially horizontal axis of rotation, the drive wheel being pivotable with the fork about the vertical axis of the fork;
   an electrical motor mounted to the fork and coupled to the drive wheel to cause rotation of the drive wheel;
   first and second batteries coupled to the motor so as to deliver electrical power to the motor, the first battery being supported on a first of the lower frame portions located at a first of the lateral ends of the chassis, the second battery being supported on a second of the lower frame portions located at a second of the lateral ends of the chassis;

first and second sets of caster wheels coupled to the lower frame portion of the chassis, the drive wheel being larger than the first and second sets of caster wheel, centrally located between the first set and the second set of caster wheels, and projecting below the first and second sets of caster wheels so that the self-propelled device is supported by the drive wheel and by only one of each of the first and second sets of castor wheels at any given time to establish a three-point contact with a surface supporting the self-propelled device;

at least two drag wheels mounted to the lower extremities of the upright frame portions of the chassis and extending aft from the aft end of the chassis so as to come into contact with a surface supporting the self-propelled device and thereby inhibit tipping of the self-propelled device when the self-propelled device tips in an aft direction; and a tiller pivotably coupled to the fork to enable pivoting of the drive wheel about the vertical axis of the fork, the tiller comprising means for controlling operation of the motor and the drive wheel.

15. The freestanding self-propelled device according to claim 14, wherein the gripping means further comprises an arm adjustably attached to the beam and a set of upper and lower jaws mounted to the arm, the upper jaw being immovably mounted to the arm and the lower jaw being movably mounted to the arm for movement relative to the upper jaw.

16. The freestanding self-propelled device according to claim 14, wherein the fork and the drive wheel are pivotable together through an angle of approximately 180 degrees about the vertical axis of the fork.

17. The freestanding self-propelled device according to claim 14, wherein the tiller is connected to the fork through friction members that contact each other and move relative to each other when the tiller is pivoted relative to the fork.

18. The freestanding self-propelled device according to claim 14, wherein the tiller is pivotable through an angle of greater than 90 degrees relative to the fork.

* * * * *